Patented July 22, 1952

2,604,472

UNITED STATES PATENT OFFICE 2,604,472

FORMATION OF STREPTOMYCIN AZO SALT FROM STREPTOMYCIN FERMENTATION BROTH

Peter P. Regna, West New York, N. J., and Isaiah A. Solomons III, Jackson Heights, N. Y., assignors to Chas. Pfizer & Co., Inc., a corporation of Delaware No Drawing. Application April 22, 1947,
Serial No. 743,206

3 Claims. (Cl. 260—236.5)

This invention relates to the recovery of streptomycin from crude aqueous solutions of same, such as fermentation broths, and it has for its object to provide a novel and improved process for this purpose.

Another object of the invention is to provide an efficient and economical method of precipitating streptomycin of high antibiotic activity directly from fermentation broths.

Various other objects and advantages will be apparent as the nature of the invention is more fully disclosed.

Streptomycin, an antibiotic produced by fermentation from selected strains of cultures of *Streptomyces griseus*, is a highly potent antibacterial agent which is effective against a wide variety of pathogenic organisms. Clinical indications for the use of streptomycin have been observed in urinary tract infections, due to gram negative microorganisms, influenza bacillus meningitis, tracheobronchitis and pneumonia, tularemia, opthalmic infections due to *Ps. pyocyaneus*, peritonitis due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolite or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

We have now discovered that streptomycin is almost quantitatively precipitated from fermentation broths, in the form of a dye salt, by combining the streptomycin in the growth medium with sodium -p-(2-hydroxy-naphthylazo)-benzene sulfonate, a dye which is also known as Orange II. Although the broth can be treated with the dye at any pH within pH 2 to 10 (outside these limits of hydrogen ion concentration, streptomycin is not stable; see "Stability of Streptomycin" by Regna, Wasselle and Solomons, J. Biol. Chem., vol. 165, p. 631, (1946)) for best results we prefer to carry out the precipitation at about pH 5.5.

A rather exact quantity of Orange II is necessary to achieve best results according to our process, because an appreciable excess of the dye solubilizes the streptomycin-Orange II salt. The required quantity of dye depends on the concentration of streptomycin in the broth and this may be determined by adding increasing amounts of sodium - p - (2-hydroxy - naphthylazo)-benzene sulfonate to small samples of the fermentation broth until the maximum precipitation of streptomycin for the minimum amount of dye is established. This is done by filtering the streptomycin-Orange II precipitates and assaying the filtrates by microbiological methods using *Escherichia coli* and *Bacillus subtilis* similar to those employed for penicillin assays. The *B. subtilis* plate assay is carried out by the method of Schmidt and Moyer (J. Bact., vol. 47, p. 199, (1944)), and the *E. Coli* turbidimetric assay by the procedure of McMahan (J. Biol. Chem., vol. 153, p. 249, (1944)).

Kuehl, Peck, Walti, and Folkers, Science, vol. 102, p. 34, (1945), characterized streptomycin by making a derivative with Orange II. They first prepared highly-purified streptomycin trihydrochloride, and then reacted this with Orange II to produce a crystalline salt. No attempt was made, by these workers, to apply such technique as a recovery method for streptomycin. These two situations, that is, the reacting of Orange II with streptomycin trihydrochloride by Kuehl, et al., and the method of the present invention involving precipitation of streptomycin from the broth, are vastly different.

To emphasize this point, Kuehl, et al. also used, in their preliminary purification of streptomycin, Methyl Orange (the sodium salt of helianthine) to form a crystalline salt with highly purified concentrates of streptomycin. However, the use of Methyl Orange for recovery of streptomycin from fermentation broths is inoperative. On this basis, there could be no prediction that either one of the dyes could be utilized as precipitating agents on fermentation broths. In fact, no generalizations can be made which correlate the structure of the dyes with the insolubility of their streptomycin salts. The streptomycin salt of Orange II is quite insoluble, whereas the streptomycin salt of Orange I (sodium α-naphtholazobenzene-p-sulfonate), which differs only in the position of one hydroxyl group is too soluble.

The fermentation broth referred to in the following examples may be produced by a strain of

*Streptomyces griseus* grown on media containing 1% glucose, 0.5% peptone, 1.2% corn steep liquor and 0.5% sodium chloride, and on modifications of these media.

Examples 1

Three liters of streptomycin fermentation broth, after filtering the mycelium, was adjusted with sulfuric acid to pH 5.3. To the solution containing 600,000 mcg. there was added 20 g. of supercel (this large amount of filter-aid is not necessary for purposes of aiding the filtration, but is a means of keeping the precipitate well dispersed in the subsequent conversion of the streptomycin-Orange II to streptomycin trihydrochloride, as disclosed and claimed in our copending application Serial No. 746,3312, filed May 6, 1947, now Patent No. 2,555,760); and this was followed by 6 g. of Orange II. After stirring for one hour, the precipitate was filtered and sucked dry on a Beuchner funnel. The filtrate contained 13 mcg./ml. (6.5%). A portion of the dry cake was dissolved in 1:1 methanol-water mixture and filtered from the supercel. An assay, by the agar plate method using *B. subtilis* and a turbidimetric method using *E. coli*, after correcting for the supercel, showed 235 mcg./mg. which on the basis of streptomycin sulfate is 500 mcg./mg.

Example 2

To 4 liters of a filtered streptomycin fermentation broth (100 mcg./ml.) at pH 7.8 was added 40 g. of Norite A, stirred one hour and filtered over a supercel pre-coated filter. The carbon adsorbate was suspended in 300 ml. of 0.1 N HCl and stirred for one-half hour. The mixture was then filtered, and the clear filtrate was neutralized with sodium hydroxide to pH 5.5 and re-filtered. The eluates from several of the above adsorption experiments were combined until 2500 ml. were accumulated containing 1,450,000 mcg. of streptomycin. To the solution at pH 5.5 was added 20 g. supercel and 6 g. of Orange II (approximately 1 g./ 250,000 mcg.), dissolved in 50 ml. of water. After stirring two hours, the whole precipitate was filtered. The filtrate contained 25 mcg./ml. (4.3%). A portion of the dry cake was dissolved in 1:1 water-methanol mixture, filtered from the supercel and assayed by the agar plate method using *B. subtilis* and a turbidimetric method using *E. coli:* 175 mcg./mg.

Example 3

To 1.5 liters of a filtered fermentation broth (237,000 mcg.) at pH 5.5, 5 g. of supercel and 1.5 g. of Orange II was added. This was stirred for one-half hour and filtered. The filtrate contained 14 mcg./ml. (about 10%). A portion of the dried cake was dissolved in 1:1 water-methanol mixture, filtered from the supercel and assayed by the agar plate method using *B. subtilis* and a turbidimetric method using *E. Coli:* 80 mcg./mg.

The invention claimed is:

1. Method of recovering a streptomycin salt from a clarified streptomycin fermentation broth which comprises treating said broth at a pH of 2 to 10 with sodium -p-(2-hydroxy-naphthylazo)-benzene sulfonate to precipitate a streptomycin salt of said dye.

2. Method of recovering a streptomycin salt from a clarified streptomycin fermentation broth which comprises adjusting said broth to about pH 5.5 and treating said broth with sodium -p-(2-hydroxy-naphthylazo)-benzene sulfonate to precipitate a streptomycin salt of said dye.

3. Method of recovering a streptomycin salt from a clarified streptomycin fermentation broth which comprises reacting said broth at a pH range of 2 to 10 with sodium -p-(2-hydroxy-naphthylazo)-benzene sulfonate in a predetermined amount sufficient to precipitate a streptomycin salt of said dye and insufficient to solubilize said salt.

PETER P. REGNA.
ISAIAH A. SOLOMONS III.

REFERENCES CITED

The following references are of record in the file of this patent:

UNITED STATES PATENTS

| Number | Name | Date |
| --- | --- | --- |
| 2,462,175 | Folkers | Feb 22, 1949 |

OTHER REFERENCES

Kuehl et al., Science vol. 102 (1945), pages 34, 35, 2 pages.